United States Patent
Bariska, Jr. et al.

(10) Patent No.: US 9,471,477 B2
(45) Date of Patent: *Oct. 18, 2016

(54) MONITORING AND CAPTURING EARLY DIAGNOSTIC DATA

(71) Applicant: International Business Machines Corporation, Armonk, NY (US)

(72) Inventors: Arthur J. Bariska, Jr., Tucson, AZ (US); Matthew T. Cousens, Catskill, NY (US); Eileen S. Kovalchick, Tucson, AZ (US); Joel L. Masser, San Jose, CA (US); Kevin D. McKenzie, Poughkeepsie, NY (US); Eileen P. Tedesco, Sharon, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/067,510

(22) Filed: Mar. 11, 2016

(65) Prior Publication Data

US 2016/0179661 A1    Jun. 23, 2016

Related U.S. Application Data

(63) Continuation of application No. 13/747,928, filed on Jan. 23, 2013.

(51) Int. Cl.
*G06F 11/00* (2006.01)
*G06F 11/36* (2006.01)

(52) U.S. Cl.
CPC ................................ *G06F 11/3688* (2013.01)

(58) Field of Classification Search
CPC ............ G06F 11/30–11/3096; G06F 11/0706; G06F 11/0754; G06F 11/0778; G06F 11/3688
See application file for complete search history.

(56) References Cited

U.S. PATENT DOCUMENTS

| | | | | |
|---|---|---|---|---|
| 5,696,701 A | * | 12/1997 | Burgess | G06F 11/348 702/186 |
| 6,629,266 B1 | * | 9/2003 | Harper | G06F 11/1438 714/38.1 |
| 6,658,586 B1 | * | 12/2003 | Levi | B60R 25/04 714/4.3 |
| 7,269,824 B2 | | 9/2007 | Noy et al. | |
| 8,707,194 B1 | * | 4/2014 | Jenkins | H04L 67/025 715/772 |
| 8,973,133 B1 | | 3/2015 | Cooley | |
| 2010/0125657 A1 | * | 5/2010 | Dowling | G06F 11/3051 709/224 |
| 2010/0223497 A1 | * | 9/2010 | Schneider | G06F 11/3409 714/5.11 |
| 2011/0276840 A1 | * | 11/2011 | Fresson | G06F 11/076 714/47.2 |
| 2012/0060173 A1 | * | 3/2012 | Malnati | G06F 11/3055 719/318 |
| 2012/0272249 A1 | * | 10/2012 | Beaty | G06F 9/5083 719/318 |

* cited by examiner

*Primary Examiner* — Jason Bryan
(74) *Attorney, Agent, or Firm* — Cantor Colburn LLP; William A. Kinnaman, Jr.

(57) ABSTRACT

A deviance monitoring module is provided for examining various parameters of an operating system for deviance from a baseline behavior at specified intervals. A range of acceptable deviance values from a baseline behavior is set for parameters of an operating system. The parameters of the operating system are then monitored at specified intervals for deviance from the baseline behavior. In response to detecting that the deviance exceeds a predetermined threshold, the method triggers diagnostic data gathering on the parameters of the operating system according to an embodiment.

1 Claim, 2 Drawing Sheets

MONITORING AND CAPTURING EARLY DIAGNOSTIC DATA

DOMESTIC PRIORITY

This application is a continuation of the legally related U.S. application Ser. No. 13/747,928 filed Jan. 23, 2013, which is fully incorporated herein by reference.

BACKGROUND

The present invention relates to computer systems management, and more specifically, to monitoring parameters of an operating system for deviance from a baseline behavior and to triggering diagnostic data gathering in response to the deviance exceeding a predetermined threshold.

When contemporary operating systems experience an error or unexpected result in a computing environment, a great deal of time and resources are typically spent determining the root cause of the error or unexpected result. Typically, insufficient documentation is collected on the operating systems to allow a complete diagnosis to be performed. Clients and testers are required to recreate error situations to attempt to gather additional documentation on a subsequent failure. By the time a software problem percolates up to the operating system, making itself known, the initial problem may have already disappeared from traces, making the debugging of the initial problem difficult.

SUMMARY

According to an embodiment, a computer-implemented method that is implemented by a processing device is provided for setting a range of acceptable deviance values from a baseline behavior for parameters of an operating system. The parameters of the operating system are then monitored at specified intervals for deviance from the baseline behavior. In response to detecting that the deviance exceeds a predetermined threshold, the method triggers diagnostic data gathering on the parameters of the operating system according to an embodiment.

According to another embodiment, a computer system including a processor, a system memory, and a bus that couples various system components including the system memory to the processor, is configured to set a range of acceptable deviance values from a baseline behavior for parameters of an operating system. The parameters of the operating system are then monitored at specified intervals for deviance from the baseline behavior. In response to detecting that the deviance exceeds a predetermined threshold, the computer system triggers diagnostic data gathering on the parameters of the operating system according to an embodiment.

According to another embodiment, a computer program product including a non-transitory computer readable storage medium having computer readable program code stored thereon that, when executed, provides the setting of a range of acceptable deviance values from a baseline behavior for parameters of an operating system. The parameters of the operating system are then monitored at specified intervals for deviance from the baseline behavior. In response to detecting that the deviance exceeds a predetermined threshold, the computer readable program code triggers diagnostic data gathering on the parameters of the operating system according to an embodiment.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein provide the monitoring of parameters of an operating system for deviance from a baseline behavior and the triggering of diagnostic data gathering in response to the deviance exceeding a predetermined threshold.

In the contemporary art, clients and testers typically attempt to determine an apparent root cause of the problem by setting a trap of some sort for a particular condition, and then attempting to recreate the problem, if possible, to catch earlier data. This typically requires multiple iterations, and assumes that the problem can be easily recreated, which is often not true.

Embodiments disclosed herein provide a deviance monitoring module for examining various parameters of an operating system for deviance from a baseline behavior at specified intervals. In response to the deviance exceeding a specified threshold, a diagnostic gathering module is triggered to automatically gather diagnostic data documentation. Accordingly, the diagnostic data documentation is potentially gathered early enough in the life cycle so that the root of the problematic parameter may be debugged quickly without the need for multiple recreates. Further, in response to the deviance values of a monitored parameter returning to a specified value within the time frame specified on an exception list, the diagnostic data documentation will be logged and deleted after a specified period of time according to embodiments. Any time the diagnostic gathering module gathers diagnostic documentation, a notification may alert an interested parties list. Embodiments also provide the initiation of recovery or remediation actions.

Figure 1:
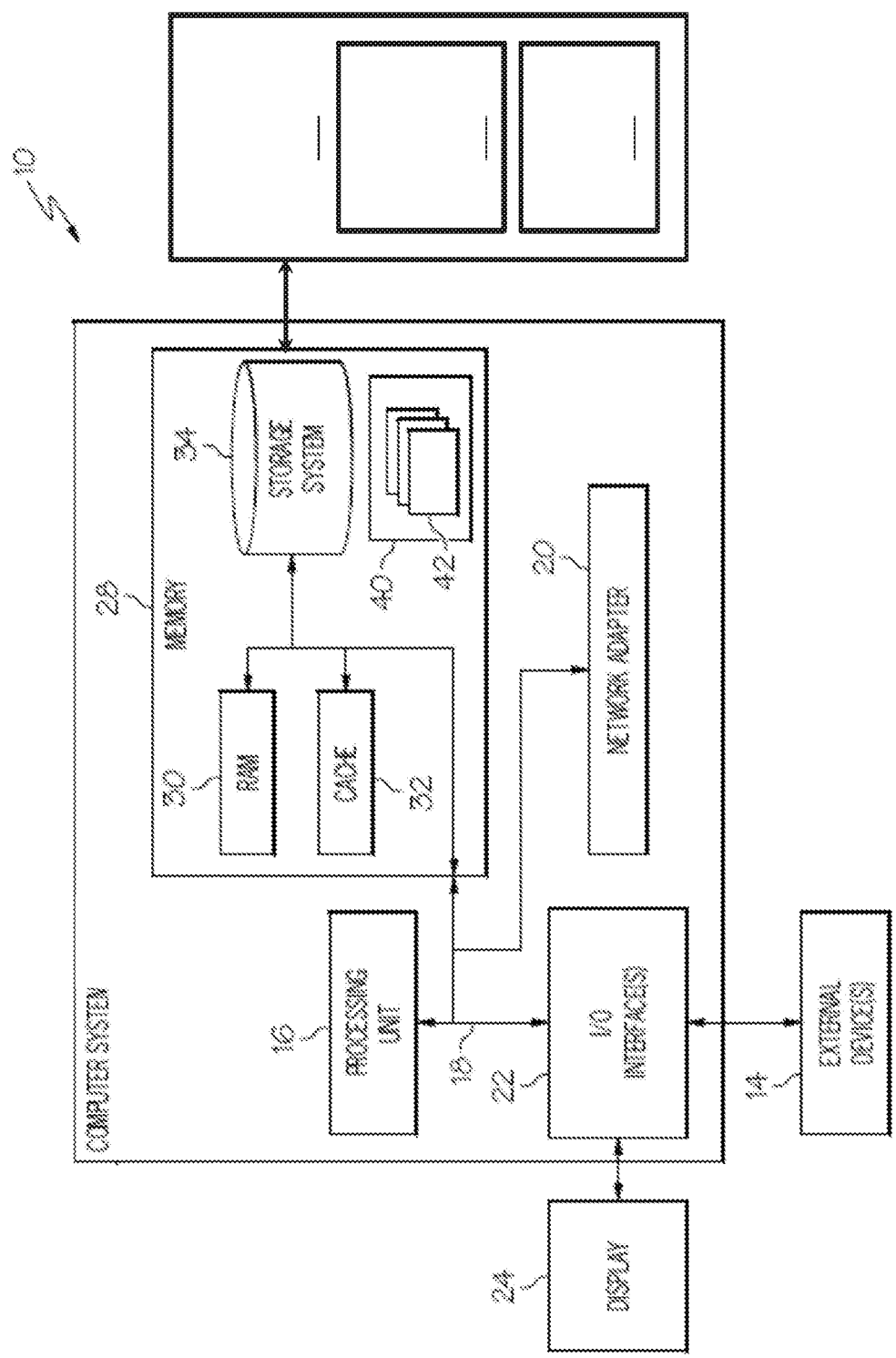
FIG. 1 depicts a block diagram of a computer system according to an embodiment.

Referring now to FIG. 1, a block diagram of a computer system 10 suitable for monitoring parameters of an operating system for deviance from a baseline behavior and triggering diagnostic data gathering in response to the deviance exceeding a predetermined threshold. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

According to an embodiment, a deviance monitoring module 100 carries out the functions and/or methodology for monitoring parameters of an operating system or a program for deviance from a range of acceptable values from a baseline behavior. The deviance monitoring module 100 includes a diagnostic gathering module 102 for gathering diagnostic data for each monitored parameter of the operating system or program, and an exception list 104 including a set of parameters and their allowable amount and time of deviation from a baseline behavior.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
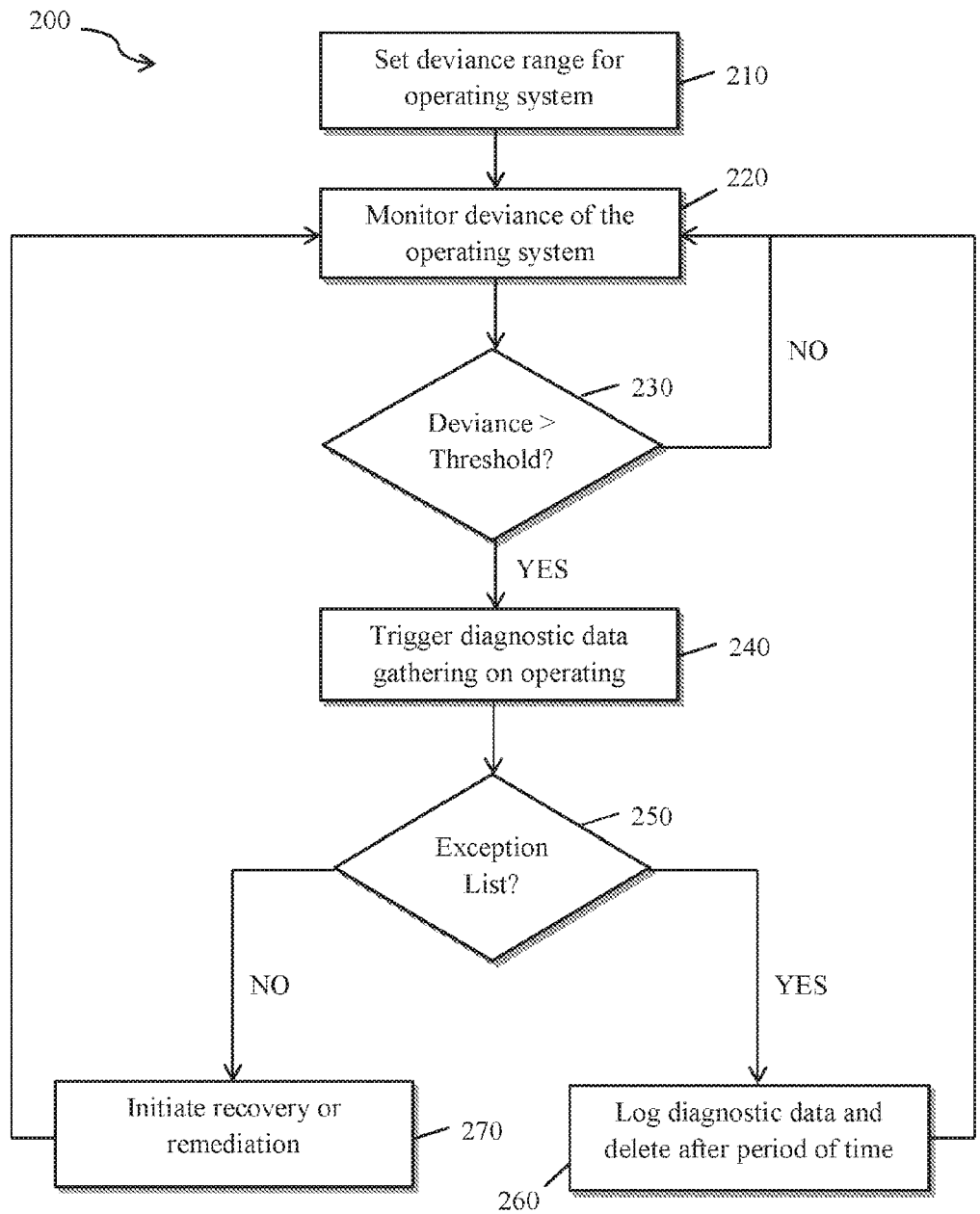
FIG. 2 depicts a flow diagram of a monitoring operation for monitoring an operating system or program for deviance from a baseline behavior according to an embodiment.

With reference now to FIG. 2, a monitoring operation 200 for monitoring an operating system or program for deviance from a baseline behavior is shown in accordance with an embodiment.

In block 210, a deviance range of acceptable values is set in the deviance monitoring module 100 for certain parameters of the operating system or program. In an embodiment, a user may provide the expected and/or allowed range of acceptable values for certain parameters of the operating system to the deviance monitoring module 100. The range of acceptable values may be set according to historical data observed by a separate monitoring application according to an embodiment.

In block 220, the operating system is monitored at specified intervals for deviance from the range of acceptable values set in block 210 for certain parameters of the operating system. According to an embodiment, a user may set the specific intervals for monitoring the deviance of certain operating system parameters. Depending on the operating system or program being monitored, the data can be collected in a number of known ways. For example, an operating system may report data in system management facility (SMF) records and via resource management facility (RMF) interfaces, while other operating systems may provide application programming interfaces (APIs).

In block 230, the deviance monitoring module 100 determines whether a monitored parameter exceeds the predetermined range of acceptable values set in block 210 according to an embodiment. If the monitored parameter does not exceed the predetermined range of acceptable values, then the deviance monitoring module 100 continues to monitor the operating system parameters at the specified intervals as shown in block 220. If, however, the monitored parameter does exceed the predetermined range of acceptable values, the diagnostic gathering module 102 is triggered and diagnostic data is gathered on the monitored parameter as shown in block 240. Along with the monitoring values, a set of diagnostic data to be gathered for each monitored parameter may be provided by a user or a separate monitoring application. The gathered diagnostic data may be in addition to or instead of an optional default data diagnostic application of the computer system 10.

According to an embodiment, the deviance monitoring module may include an exception list 104 that includes a set of parameters and their allowable amount and time of deviation from the baseline behavior.

For example, on a regular basis, a program that does database optimization may run, and during that time, I/O rates and central processing unit (CPU) utilization may increase. If there are allowed exceptions, the exception may consist of the affected monitored parameter (in this case, there would be one entry for I/O rates and one for CPU utilization), a list of programs/address spaces associated with the changed to the monitored parameter (in this case, either the database program or the optimization program), the amount of expected deviation to the parameter, a time value for the duration of clock time that the associated program/address space(s) are allowed to cause the parameter to deviate from the expected value, and one or more sets of percentages of various time units that the program is expected to cause the parameter to deviate.

As an example, in the case of the database optimization program, assume that the database optimization program is expected to run once a day, and that it is expected to run for half an hour when it runs. This means that the duration of clock time that the database optimization program would be allowed to run without triggering the data gathering of an embodiment would be 50% of any given hour, and 2.1% of any given day. Accordingly, an embodiment handles the case where, for example, a bug is triggered that causes the CPU utilization by the database optimization program to run for 15 minutes every hour. The 50% of any given hour condition set in the exception list of an embodiment would be satisfied, but not the 2.1% utilization for any given day condition.

As shown in block 250, in response to a monitored parameter triggering the diagnostic gathering module 102, an embodiment determines whether the deviance falls within the exception list 104. The exception list specifies an allowable time frame for monitored parameter values with a deviance exceeding a predetermined threshold to return within limits of the predetermined threshold.

In response to the deviance of the monitored parameter returning to a predetermined threshold within a specified amount of time specified in the exception list, the diagnostic data is logged and deleted after a predetermined period of time, as shown in block 260. The deviance monitoring module 100 then continues to monitor the operating system parameters at the specified intervals as shown in block 220.

In response to the deviance of the monitored parameter not returning to a predetermined threshold within a specified amount of time specified in the exception list, the deviance monitoring module 100 initiates a known recovery or remediation application, as shown in block 270. The deviance monitoring module 100 then continues to monitor the operating system parameters at the specified intervals as shown in block 220.

According to an embodiment, any time the diagnostic gathering module 102 gathers diagnostic documentation, interested parties may be notified. A notification may be transmitted via email, pager, SMS, and/or the like to anyone on an interested parties' list based on the types of alerts they are interested in.

An example of an implementation of an embodiment of the deviance monitoring module 100 will now be discussed. On a z/OS system, a scheduler attempts to ensure that every running program has some amount of access to the CPU in accordance with the importance of the program. Programs of similar importance will generally have equal access to the CPU, assuming that they do not have to wait for I/O to complete. So a program that simply does addition, and is running at a high importance, should have frequent access to the CPU. A monitoring may be set up to look in the scheduler control blocks to see the last time the program ran, and compare that to the current time. If the difference between those two times exceeded a given interval, data gathering could be triggered.

Other examples of implementation of embodiments of the deviance monitoring module 100 may include memory usage, which might indicate a storage leak, I/O rates, log update rates, time inside a subroutine. Similarly, for some programs, CPU, memory access, and I/O activity are correlated, so a program that is expected to do frequent memory and I/O access while it is using the CPU (e.g., the database optimization program) could potentially be looping if it is only using the CPU for an extended period of time. Similarly, a task that primarily does I/O should be generating memory access requests and I/O requests, but if it begins using large amounts of real memory itself it could be leaking memory. For work that is transaction-oriented, either having transactions take significantly longer or shorter than a specified valued could indicate a hang or a recursive failure.

Embodiments may have value on other platforms and hardware. Both storage and processor hardware have expected ranges they operate within, for such things as I/O rates, instructions per second, cache utilization, buffer sizes, and the like. Deviation from norms for a given customer could also be used to identify potential error situations and activate a state save or enhanced tracing for a period of time that would allow better diagnostics of factors leading up to a failure. Accordingly, embodiments also apply to other platforms and their associated hardware, both in the open systems areas as well as with portable and handheld devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method, comprising:
    setting, with a processing device, a range of acceptable deviance values from a baseline behavior for parameters of an operating system, wherein a user provides the range of acceptable deviance values from the baseline behavior for parameters of the operating system;
    monitoring the parameters at specified intervals for a deviance from the baseline behavior;
    determining whether the deviance falls within an exception list, wherein the exception list specifies an allowable amount of deviation of the monitored parameter values from the baseline behavior and allowable time values of deviation for the monitored parameter values from the baseline behavior, wherein the allowable time values include a set of time units and percentages of time units for which deviation is expected and wherein the exception list also specifies a list of programs associated with the monitored parameter values; and triggering diagnostic data gathering on the parameters of the operating, system in response to the deviance exceeding a predetermined threshold;

notifying interested parties of the gathered diagnostic data, wherein, in response to the deviance returning within the predetermined threshold within a specified amount of time specified in the exception list, the diagnostic data is logged and deleted after a predetermined period of time.

* * * * *